United States Patent

Isborn, deceased et al.

[11] Patent Number: 4,802,301
[45] Date of Patent: Feb. 7, 1989

[54] HUMANE RACCOON TRAP

[76] Inventors: Jack E. Isborn, deceased, late of Talmage, Calif.; Nora S. Isborn, heir, P.O. Box 327, Talmage, Calif. 95481

[21] Appl. No.: 199,440
[22] Filed: May 27, 1988
[51] Int. Cl.⁴ ............................................. A01M 23/00
[52] U.S. Cl. ............................................. 43/58; 43/61
[58] Field of Search .................... 43/58, 61, 78, 81, 88, 43/89, 90, 91

[56] References Cited

U.S. PATENT DOCUMENTS

| | | | |
|---|---|---|---|
| 830,284 | 9/1906 | Barry | 43/92 |
| 1,858,096 | 5/1932 | Lementy | 43/58 |
| 4,158,929 | 6/1979 | Custard | 43/58 |
| 4,308,682 | 1/1982 | Cesar | 43/88 |
| 4,424,640 | 1/1984 | Cook | 43/93 |
| 4,483,093 | 11/1984 | Isborn | 43/58 |
| 4,549,368 | 10/1985 | Bustle | 43/88 |

Primary Examiner—Gene P. Crosby
Attorney, Agent, or Firm—Melvin R. Stidham

[57] ABSTRACT

An animal trap comprises a complete enclosure with just a small hole in the top wall to provide access to the bait on the inside. The trap is sprung to clamp firmly around an animal's paw only if he reaches down through the hole and lifts the bait. In such case, a trigger arm is raised free of an aligned catch and two thick jaws having no sharp edges are brought quickly together. The initial alignment of the trigger arm may be set precisely by a setting screw, and the threaded engagement with the setting screw prevents misalignment.

8 Claims, 2 Drawing Sheets

HUMANE RACCOON TRAP

BACKGROUND OF THE INVENTION

Certain animals, such as raccoons, are considered by farmers to be pests by reason of their destruction of vegetation, poultry and small animals. On the other hand, such animals are valuable for their furs as well as for their meat. Accordingly, fur trapping continues to be a flourishing business in some parts of the country, and many cooperative arrangements are made between farmer and trapper wherein traps are set at scattered points about a farm or ranch to rid the farmer of these pests and to give the trapper the "harvest" of his traps. However, many traps that are effective to capture raccoons will also capture and injure pets, such as dogs.

The inventor has previously developed a trap, which is shown in his prior U.S. Pat. No. 4,483,093 granted Nov. 20, 1984. The trap there shown cannot be sprung by applying a downward force to the trigger arm, as by stepping on it or pouncing on the bait. The trap can be sprung only by raising the baited end of a trigger arm, thus limiting capture to just those animals that lift their food to eat. However, when such trap was sprung, the animal's paw was caught between a rapidly closing thin metal gate and the relatively sharp edge of an opening in a sheet metal housing, through which the animal inserted his paw to seize the bait. This could cut and seriously injure the animal's paw and, particulary in the case of animals too small to capture, this was to be avoided.

OBJECTS OF THE INVENTION

It is an object of this invention to provide a raccoon trap that cannot be triggered by household pets and other small animals.

It is a further object of this invention to provide a trap that will capture only raccoons.

It is a further object of this invention to provide a trap that is conditioned to seize and firmly hold a raccoon's paw without injuring it.

It is a further object of this invention to provide a spring-actuated raccoon trap that is easily set without on site adjustment.

It is a further object of this invention to provide a raccoon trap that will grasp a raccoon's paw firmly without cutting it.

Other objects and advantages of this invention will become apparent from the description to follow, particulary when read in conjunction with the accompanying drawing.

SUMMARY OF THE INVENTION

In carrying out this invention I provide a small housing of steel or the like with a small hole in the top to permit entry of a raccoon's paw, but to prevent entry of the paws of medium size and larger dogs. A gate snaps rapidly across the opening to seize a raccoon's paw should he extend it through the opening to lift bait that has been placed therein. The gate can only be triggered by a latch which is pulled upward at its baited end as by a raccoon that lifts its food to eat. Downward pressure on the latch, as would occur if an animal stepped through the opening or pressed downward on the bait, will not trigger the latch. The jaws of the trap are thick enough that they will not cut when snapped together on the animal's paw and the spring force is limited so as to capture and hold the animal without injury.

DESCRIPTION OF A PREFERRED EMBODIMENT

Figure 1:
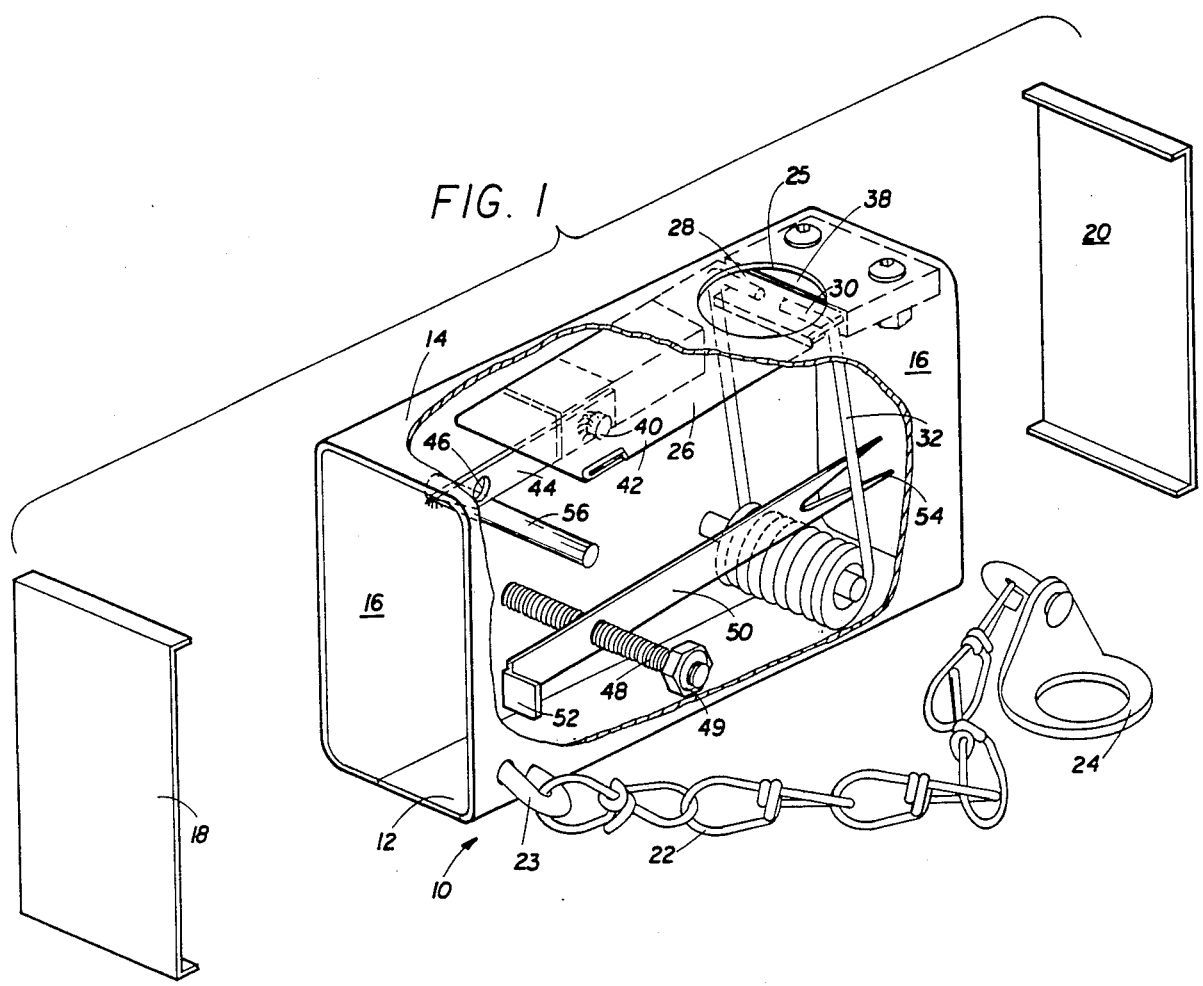
FIG. 1 is a view in perspective, partially broken away, of a raccoon trap embodying features of this invention.

Referring now to the drawing with greater particularity, the raccoon trap 10 of this invention comprises a rectangular housing of sheet steel or the like, with bottom wall 12, top wall 14 and side walls 16. End closures 18 and 20 may be snapped onto the ends of the housing to close off the open ends, and a chain 22 is secured to the housing at 23 with a ring 24 provided at the end of the chain for anchoring the trap 10.

After baiting the trap 10 in the manner to be described, the end closures are attached and the trap is normally buried in the ground G, with just an opening 25 in the top wall 14 exposed to allow the animal access to the bait. It should be noted that the access opening 25 is a small hole, i.e. about 1¼ inch in diameter, and therefore, large enough to receive the paws of just a few types of animals, such as raccoons. Medium size dogs and larger, as well as large cats and other domestic animals cannot even gain entry to the trap 10.

Figure 2:
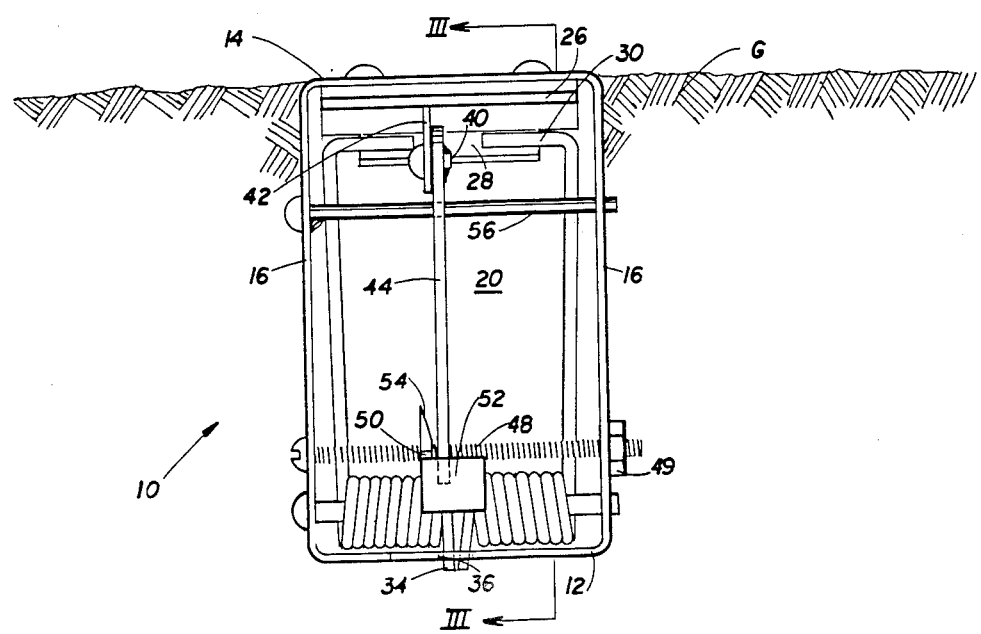
FIG. 2 is a vertical section view of the trap showing the latch and spring mechanisms.
Figure 3:
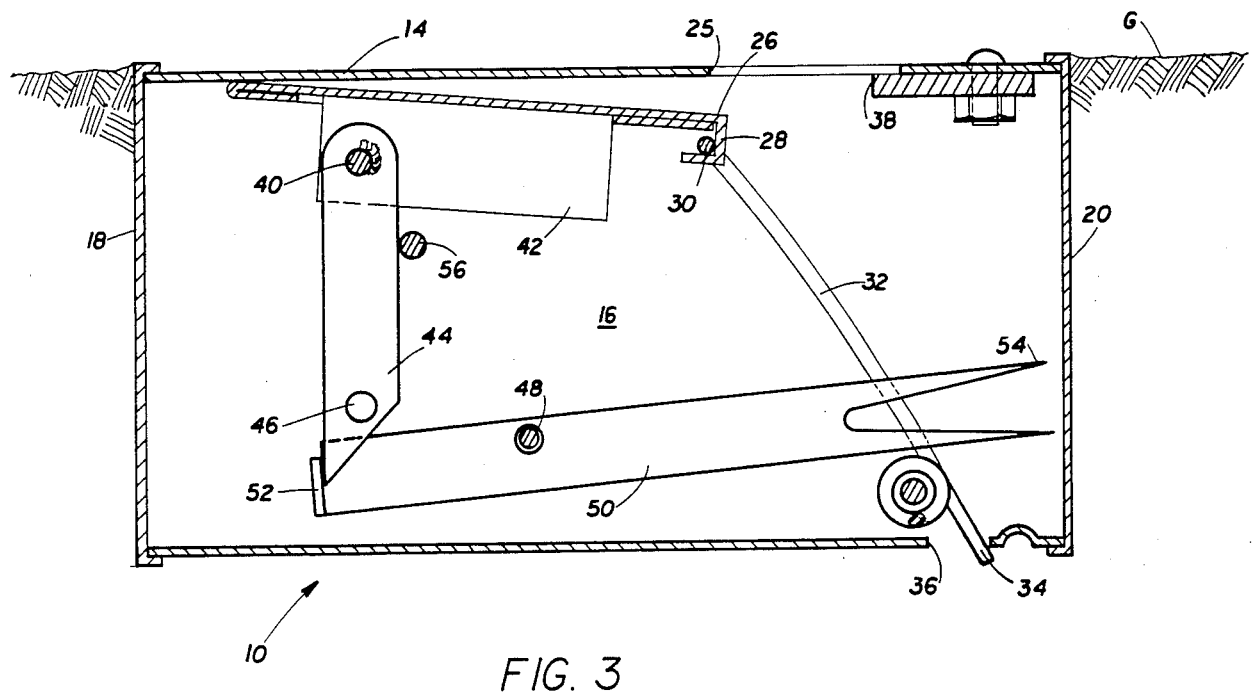
FIG. 3 is a section view taken along line III—III of FIG. 2.

A gate 26, forming one jaw of the trap 10 is bent back at 28 to freely receive the inwardly directed ends 30 of a pair of relatively strong coil springs 32, the other ends 34 of the coil spring being anchored through a hole 36 in the bottom wall 12 (FIGS. 2 and 3). Hence, when the trap 10 is set, the gate 26 is held in the position shown in FIG. 3 and, when released, it snaps toward the position shown in FIG. 1 toward a thick opposite jaw 38 that extends along a chord of the circular opening 25, effectively gripping an animal's paw extended through the opening 25. It should be emphasized that the animal's paw is gripped between the thick jaws 28 and 38 and is not pressed against the sheet metal of the top wall 14 where it is more likely to be seriously cut or broken.

Pivoted at 40 to a rail 42, which is welded to the bottom of the gate 26, is a depending arm 44 having a gripping hole 46 near the end thereof. Pivotally mounted on a bolt 48 exending between the side walls 16 is a trigger arm 50, having a laterally turned end portion 52 that engages and holds the lower end of the depending arm 44 when the trap 10 is set in the position shown in FIGS. 2 and 3. The trigger arm 50 is so set after placement of a piece of bait (not shown) on the tines of a fork, which is formed on the other end of the trigger arm 50. Downward movement of the other end 54 of the trigger arm 50 is prevented by engagement with the coil springs 32, so that the trap can only be sprung by upward movement of the fork, as would be occasioned by an animal lifting the bait and, hence, the forked end 54. Grasping and lifting food in this manner is characteristic of a raccoon. It will be apparent, particularly from FIGS. 2 and 3, that the depending arm 44 which holds the gate 26 is fulcrumed against a cross rod 56 that extends between the sides 16, and can only be released by lowering the inwardly turned end 52 of the trigger arm 50 as by lifting the fork end 54. Any downward force on the distal end 54, as by a small pet or other animal stepping on it, will have no effect and will not release the depending arm 44.

It will be noted that the trigger arm 50 is threaded onto the pivot bolt 48. Hence, once set to be aligned with the depending arm 44 it cannot be inadvertently dislodged axially along the bolt 48. Initial alignment is achieved by loosening the nut 48 and turning the bolt 48 to cause the trigger arm to thread along until it is in desired alignment with the catch 58. Thereafter, on-site adjustment is not necessary.

In setting the trap 10 to the position shown in FIGS. 2 and 3 one may bait the trap at 54 and then, using a suitable tool, pull the gate 26 back to allow the depending arm 44 to swing down in alignment with the laterally disposed end 52. After the depending arm 44 is engaged behind the laterally turned end or latch 52 of the trigger arm 50, the end closures 18 and 20 are placed and the trap 10 is then buried with just the opening 25 exposed to provide access to the bait B. The force of the spring 32 is great enough to grasp a raccoon's paw quickly before he can withdraw it, but not so strong as to cause serious harm, particularly in the absence of sharp edges on the jaws 28 and 38. A spring force between 25 and 32 pounds, and preferably about 28 pounds has been found to be satisfactory for this purpose. In operation, when a raccoon lifts the bait, the depending latch arm 44 is released and the gate 26 is thrust to the right toward the position shown in FIG. 1, to firmly grip the raccoon's paw between the thick, blunt jaws 28 and 38.

While this invention has been described in conjunction with a preferred embodiment thereof, it is obvious that modifications and changes therein may be made by those skilled in the art to which it pertains without depending from the spirit and scope of this invention, as defined by the claims appended thereto.

What is claimed as invention is:

1. An animal trap comprising:
   a housing including a top panel, bottom panel, opposing side panels and end closures;
   means forming an opening in said top panel of a size to receive closely the paw of a small animal;
   a gate in said housing closely spaced below said top panel;
   said gate being mounted for movement between set position and a sprung position, respectively displaced from and underlying said opening;
   strong spring means biasing said gate into said sprung position;
   a trigger arm in said housing;
   a pivot rod extending between said side panels;
   said trigger arm being pivotally mounted between the ends thereof on said pivot rod;
   bait attaching means at one end of said trigger arm beneath said opening;
   a first latch member extending laterally from the other end of said trigger arm;
   a complementary latch member depending from and pivotally carried on said gate;
   a fulcrum rod extending between said side panels above said other end of said trigger arm so that with said gate in set position said complementary latch member may be pivoted down and forward against said fulcrum rod and engaged by said first latch member; and
   means for positioning said trigger arm laterally on said pivot rod to align said first latch member with said second latch member.

2. The animal trap defined by claim 1 wherein:
said trigger arm is threaded onto said pivot rod to be moved therealong by rotation of said pivot rod to align said first latch member with said second latch member.

3. The animal trap defined by claim 1 wherein:
the forward edge of said gate is bent back to form a relatively thick first trap jaw; and including
a relatively thick second trap jaw engageable by said first trap jaw, said second trap jaw being secured to the underside of said top panel to extend across said opening.

4. The animal trap defined by claim 3 wherein:
said opening is a generally circular hole; and
the edge of said second trap jaw forms a chord of said circular hole.

5. The animal trap defined by claim 3 wherein:
said strong spring means is a coil spring;
one end of said coil spring being secured to said bottom panel and the other end of said coil spring being rotatably received in said first trap jaw.

6. An animal trap comprising:
   a housing including a top panel, bottom panel, opposing side panels and end closures;
   means forming an opening in said top panel of a size to receive closely the paw of a small animal;
   a gate in said housing closely spaced below said top panel;
   the forward edge of said gate being bent back to form a first jaw trap;
   a thick second jaw trap secured to the underside of said top panel to extend across said opening;
   said gate being mounted for movement between set position and a sprung position, respectively, with said first jaw trap displaced from and engaging said second jaw trap;
   strong spring means biasing said gate into said sprung position;
   a trigger arm in said housing;
   a pivot rod extending between said side panels;
   said trigger arm being pivotally mounted between the ends thereof on said pivot rod;
   bait attaching means at one end of said trigger arm beneath said opening;
   a first latch member on the other end of said trigger arm;
   a complementary latch member engageable by said first latch member depending from and pivotally carried on said gate; and
   a fulcrum rod extending between said side panels above said other end of said trigger arm so that with said gate in set position said complementary latch member may be pivoted down and forward against said fulcrum rod and engaged by said first latch member.

7. The animal trap defined by claim 6 wherein:
said opening is a generally circular hole; and
the edge of said second jaw trap engaged by said first jaw trap lies along a chord of said circular hole.

8. The animal trap defined by claim 6 wherein:
said strong spring means is a coil spring;
one end of said coil spring being secured to said bottom panel and the other end of said coil spring being rotatably received in said first trap jaw.

* * * * *